United States Patent
Richardson et al.

(10) Patent No.: US 9,880,283 B2
(45) Date of Patent: Jan. 30, 2018

(54) SYSTEM, APPARATUS AND METHOD FOR LOCATING AND/OR TRACKING ASSETS

(75) Inventors: Tom Richardson, White Pine, TN (US); Santiago Romero, Mount Airy, MD (US); David S. Wisherd, Carmel, CA (US); Michael A. Wohl, Rogersville, TN (US)

(73) Assignee: ZIH Corp., Lincolnshire, IL (US)

( * ) Notice: Subject to any disclaimer, the term of this patent is extended or adjusted under 35 U.S.C. 154(b) by 897 days.

(21) Appl. No.: 12/169,742

(22) Filed: Jul. 9, 2008

(65) Prior Publication Data

US 2008/0266131 A1    Oct. 30, 2008

Related U.S. Application Data

(63) Continuation-in-part of application No. 12/028,894, filed on Feb. 11, 2008, now Pat. No. 7,755,541.
(Continued)

(51) Int. Cl.
*G08B 5/22* (2006.01)
*G01S 19/09* (2010.01)
(Continued)

(52) U.S. Cl.
CPC .............. *G01S 19/09* (2013.01); *G01S 19/07* (2013.01); *G01S 19/14* (2013.01); *G01S 19/48* (2013.01)

(58) Field of Classification Search
CPC .......... G01S 19/07; G01S 19/09; G01S 19/14; G01S 19/48; G08B 5/22
(Continued)

(56) References Cited

U.S. PATENT DOCUMENTS

| 5,345,388 A | 9/1994 | Kashiwazaki |
| 5,376,943 A | 12/1994 | Blunden et al. |

(Continued)

FOREIGN PATENT DOCUMENTS

| EP | 1 122 516 A2 | 8/2001 |
| EP | 1 234 735 A1 | 8/2002 |

(Continued)

OTHER PUBLICATIONS

"RTKNav/RtStatic/RtDLL: GPS Real-Time Kinematic Software" [online] [retrieved Feb. 27, 2008] http://www.novatel.com/products/waypoint_RTKNav_RtStatic.htm. 6 pages.
(Continued)

*Primary Examiner* — Brian Wilson

(57) ABSTRACT

A system is provided for tracking an asset within a geographic area. The system includes an antenna mast supportable by, and extending upward from, an object configured to move or facilitate movement of the asset. The antenna mast is capable of supporting a plurality of wireless locating units of a plurality of geo-spatial positioning systems, which are configured to locate a respective one or more locating units, and thereby the asset, within the geographic area. The system also includes a controller positionable on the object and configured to control operation of the wireless locating units. The controller is further configured to direct transmission of data to a host via one of the locating units or another wireless transmitter, and in a manner that accounts for a wireless link between the respective locating unit or other wireless transmitter and the host.

22 Claims, 9 Drawing Sheets

Related U.S. Application Data

(60) Provisional application No. 60/889,635, filed on Feb. 13, 2007.

(51) Int. Cl.
  *G01S 19/07* (2010.01)
  *G01S 19/14* (2010.01)
  *G01S 19/48* (2010.01)

(58) Field of Classification Search
  USPC ......... 340/870.01, 870.07, 870.11, 945, 984,
    340/988, 992, 531, 4.61, 4.62, 8.1,
    340/539.1–539.32, 572.1, 572.7, 10.1,
    340/10.4, 10.41; 342/357.31, 357.44,
    342/357.46, 357.52, 450, 457, 463, 464,
    342/465; 701/1, 2, 3, 19, 21, 22, 23
  See application file for complete search history.

(56) References Cited

U.S. PATENT DOCUMENTS

| | | | |
|---|---|---|---|
| 5,604,715 A * | 2/1997 | Aman et al. | 367/118 |
| 5,920,287 A | 7/1999 | Belcher et al. | |
| 5,995,046 A | 11/1999 | Belcher et al. | |
| 6,026,378 A | 2/2000 | Onozaki | |
| 6,035,203 A | 3/2000 | Hanson | |
| RE36,791 E | 7/2000 | Heller | |
| 6,084,513 A | 7/2000 | Stoffer | |
| 6,121,926 A | 9/2000 | Belcher et al. | |
| 6,127,976 A | 10/2000 | Boyd et al. | |
| 6,281,970 B1 | 8/2001 | Williams et al. | |
| 6,317,082 B1 | 11/2001 | Bacon et al. | |
| 6,356,802 B1 | 3/2002 | Takehara et al. | |
| 6,380,894 B1 | 4/2002 | Boyd et al. | |
| 6,434,194 B1 | 8/2002 | Eisenberg et al. | |
| 6,490,524 B1 | 12/2002 | White et al. | |
| 6,496,777 B2 * | 12/2002 | Tennison | G01M 17/00 340/991 |
| 6,502,005 B1 | 12/2002 | Wrubel et al. | |
| 6,566,997 B1 * | 5/2003 | Bradin | 340/10.2 |
| 6,577,921 B1 | 6/2003 | Carson | |
| 6,593,885 B2 | 7/2003 | Wisherd et al. | |
| 6,655,582 B2 | 12/2003 | Wohl et al. | |
| 6,657,586 B2 * | 12/2003 | Turner | G01S 5/0027 342/357.48 |
| 6,665,585 B2 | 12/2003 | Kawase | |
| 6,700,533 B1 | 3/2004 | Werb et al. | |
| 6,768,931 B2 * | 7/2004 | Takehara et al. | 700/225 |
| 6,812,839 B1 | 11/2004 | Belcher et al. | |
| 6,853,687 B2 | 2/2005 | Harrington et al. | |
| 6,859,485 B2 | 2/2005 | Belcher | |
| 6,892,054 B2 | 5/2005 | Belcher et al. | |
| 6,973,088 B2 * | 12/2005 | Kuzhiyil et al. | 370/395.2 |
| 7,187,278 B2 * | 3/2007 | Biffar | 340/539.13 |
| 7,385,500 B2 * | 6/2008 | Irwin | 340/539.13 |
| 7,423,527 B2 * | 9/2008 | Bajwa et al. | 340/539.16 |
| 7,598,863 B2 * | 10/2009 | King et al. | 340/572.1 |
| 7,693,659 B2 * | 4/2010 | Zimmerman | G01C 21/165 340/988 |
| 7,755,541 B2 * | 7/2010 | Wisherd et al. | 342/357.24 |
| 2001/0010495 A1 | 8/2001 | Helms et al. | |
| 2002/0030597 A1 | 3/2002 | Muirhead | |
| 2002/0069220 A1 * | 6/2002 | Tran | G06F 3/04883 715/209 |
| 2002/0070891 A1 | 6/2002 | Huston et al. | |
| 2002/0181565 A1 | 12/2002 | Boyd et al. | |
| 2003/0060215 A1 | 3/2003 | Graham | |
| 2003/0069648 A1 * | 4/2003 | Douglas | G06Q 10/20 700/2 |
| 2003/0137968 A1 | 7/2003 | Lareau et al. | |
| 2003/0191555 A1 | 10/2003 | Takehara et al. | |
| 2004/0102870 A1 * | 5/2004 | Andersen et al. | 700/215 |
| 2004/0249557 A1 | 12/2004 | Harrington et al. | |
| 2005/0060118 A1 | 3/2005 | Pavel et al. | |
| 2005/0256608 A1 * | 11/2005 | King | B65G 63/004 700/213 |
| 2005/0280512 A1 | 12/2005 | Forster | |
| 2006/0001528 A1 * | 1/2006 | Nitzan et al. | 340/10.33 |
| 2006/0022867 A1 | 2/2006 | Hessing | |
| 2006/0038683 A1 | 2/2006 | Claessens et al. | |
| 2006/0129691 A1 * | 6/2006 | Coffee | H04L 67/04 709/230 |
| 2006/0158338 A1 | 7/2006 | King et al. | |
| 2006/0220851 A1 | 10/2006 | Wisherd | |
| 2007/0021915 A1 | 1/2007 | Breed et al. | |
| 2007/0054696 A1 * | 3/2007 | Cooner et al. | 455/557 |
| 2007/0119927 A1 | 5/2007 | Wingo et al. | |
| 2007/0155368 A1 | 7/2007 | Phelan | |
| 2007/0222674 A1 | 9/2007 | Tan et al. | |
| 2007/0280182 A1 | 12/2007 | Wisherd et al. | |

FOREIGN PATENT DOCUMENTS

| | | |
|---|---|---|
| JP | 10-318763 A | 12/1998 |
| WO | WO 00/68907 A1 | 11/2000 |

OTHER PUBLICATIONS

Waypoint Products Group, a NovAtel Precise Positioning Product, RTKNav/RtStatic, User Guide; Revision Date May 31, 2007; Publication No. OM-20000107; Copyright Nov. 2007 Atel Inc.; 116 pages.

Supplementary European Search Report for Application No. EP 08 72 5462 dated May 3, 2011.

\* cited by examiner

SYSTEM, APPARATUS AND METHOD FOR LOCATING AND/OR TRACKING ASSETS

CROSS-REFERENCE TO RELATED APPLICATIONS

The present application is a continuation-in-part of U.S. patent application Ser. No. 12/028,894, entitled: System and Method for Tracking Vehicles and Containers, filed on Feb. 11, 2008 now U.S. Pat. No. 7,755,541, which claims priority to U.S. Provisional Patent Application No. 60/889,635, entitled: System and Method for Tracking Vehicles and Containers, filed on Feb. 13, 2007, the content of both of which are incorporated herein by reference.

FIELD OF THE INVENTION

Exemplary embodiments of the present invention generally relate to systems and methods of locating and/or tracking assets, and more particularly, relates to systems and methods of locating and/or tracking assets selectively using one or more of a plurality of geo-spatial positioning systems, including real-time locating system (RTLS) satellite-based navigation system (e.g., global positioning system—GPS, differential GPS—DGPS, etc.) techniques or the like.

BACKGROUND OF THE INVENTION

The modern marine terminal must efficiently process an increasing number of containers in an area of limited space with little, if any, land available for expansion. Capacity demands are increasing rapidly with higher volumes of container traffic worldwide and new, larger container ships coming on-line. Specific containers should be located on demand among the thousands of containers at any given time, but this can be difficult if there is a lack of an accurate and real-time container identification and tracking system of drayage tractors, switched tractors, wheeled container chassis, top and side pick loaders, and gantry and quay cranes.

Locating a container can also be complicated by the number of ways in which containers can be processed through a terminal. For example, some containers arrive via a vessel or train and are driven through a check-in gate by an outside truck. Once a container enters the terminal, it can be parked on a chassis or bomb cart in a terminal, or removed from the chassis and placed on top a stack of shipping containers. When a container is to be retrieved, it must be located among the thousands of containers in the terminal. These containers may be moved around the terminal by outside drivers, or moved by marine terminal drivers, using a client's tractor with terminal equipment.

A number of techniques have been developed for locating and tracking assets, such as containers in a marine terminal. However, it is generally desirable to improve upon existing techniques.

SUMMARY OF THE INVENTION

In light of the foregoing background, exemplary embodiments of the present invention provide an improved system, apparatus and method for tracking an asset within a geographic area. The apparatus according to one aspect of exemplary embodiments of the present invention includes a controller configured to control operation of one or more wireless locating units (e.g., tag transmitters, satellite-based navigation sensor units, etc.) of one or more geo-spatial positioning systems (e.g., real-time locating system—RTLS, satellite-based navigation system, etc.). The locating unit(s) are positionable on an object configured to move or facilitate movement of the asset; and the geo-spatial positioning system(s) are configured to locate respective locating unit(s), and thereby the asset, within the geographic area.

In various instances, the controller may be configured to control operation of a plurality of wireless locating units of a plurality of different geo-spatial positioning systems. This may include, for example, selectively control operation of the plurality of wireless locating units (loose coupling of the respective positioning systems). Additionally or alternatively, controlling operation of the plurality of wireless locating units may include controlling operation of those locating units such that the asset is locatable at one or more instances based on data from the plurality of geo-spatial positioning systems.

The controller is further configured to direct transmission of data including sensor data received from one or more sensors also positionable on the object, where at least one of the locating unit(s) may correspond to at least one of these sensor(s). In this regard, the controller is configured to direct transmission of the data to a host via one of the locating units or another wireless transmitter (e.g., WiFi transmitter), and in a manner that accounts for a wireless link between the respective locating unit or other wireless transmitter and the host. For example, the controller may be configured to collect and compile the data over one or more data collection periods, and configured to direct transmission of the compiled data. Additionally or alternatively, for example, the controller may be configured to direct transmission of the data (or compiled data) at one or more random or pseudo-random time periods, and may further be triggerable to direct transmission of the data independent of a random or pseudorandom time period.

Also, for example, the controller may be configured to compress at least a portion of the data before directing transmission of the data. In this regard, the controller may be configured to compress redundant data over a data collection period, and/or replace a larger set of data with a smaller set of data from which the larger set of data is determinable or approximable. Additionally, the controller may be configured to buffer the data when the wireless link is broken, and be configured to thereafter transmit the buffered data across the wireless link or another wireless link when the wireless link is re-established or the other wireless link is established.

In various instances, the controller may be configured to control operation of the wireless locating unit(s) of geo-spatial positioning system(s) configured to locate the asset within the geographic area in response to an event affecting location of the asset. In such instances, the controller may be configured to detect the event or verify the detected event, or communicate with a processor configured to detect the event or verify the detected event. The event may be detected or detected event verified, for example, based on a route traversed by the object over a period of time, where this route may be generally determinable based on location data from the geo-spatial positioning system(s) (where the controller may be configured to control operation of the locating unit(s) to set or adjust the granularity of the route). Additionally or alternatively, for example, the event may be detected or detected event verified based on a signature defined based on speed or acceleration values, or ranges of speed or acceleration values, over a period of time. Further, for example, the controller may be configured to determine, or communicate with the processor configured to determine, a bearing of the asset when the event occurs based on a route traversed by the object over a period of time.

According to other aspects of the present invention, a system and method are provided for tracking an asset within a geographic area. Exemplary embodiments of the present invention therefore provide a system, apparatus and method for tracking an asset within a geographic area. As indicated above, and explained below, exemplary embodiments of the present invention may solve problems identified by prior techniques and provide additional advantages.

BRIEF DESCRIPTION OF THE DRAWINGS

Figure 1:
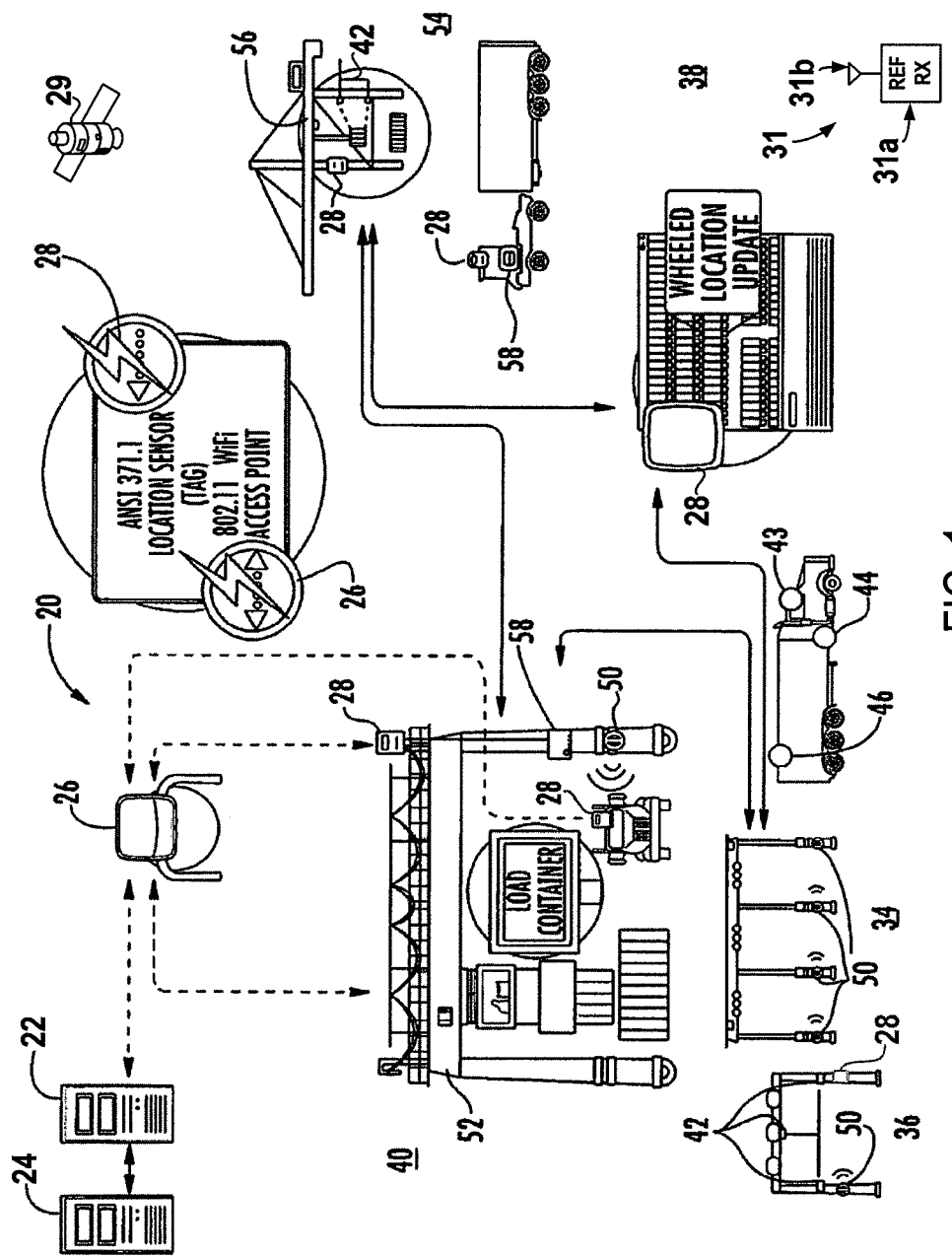
Figure 2:
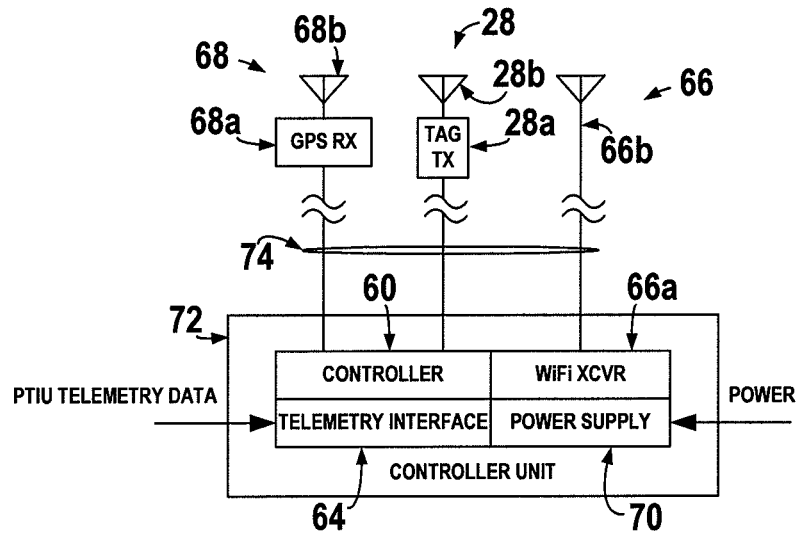
Figure 3:
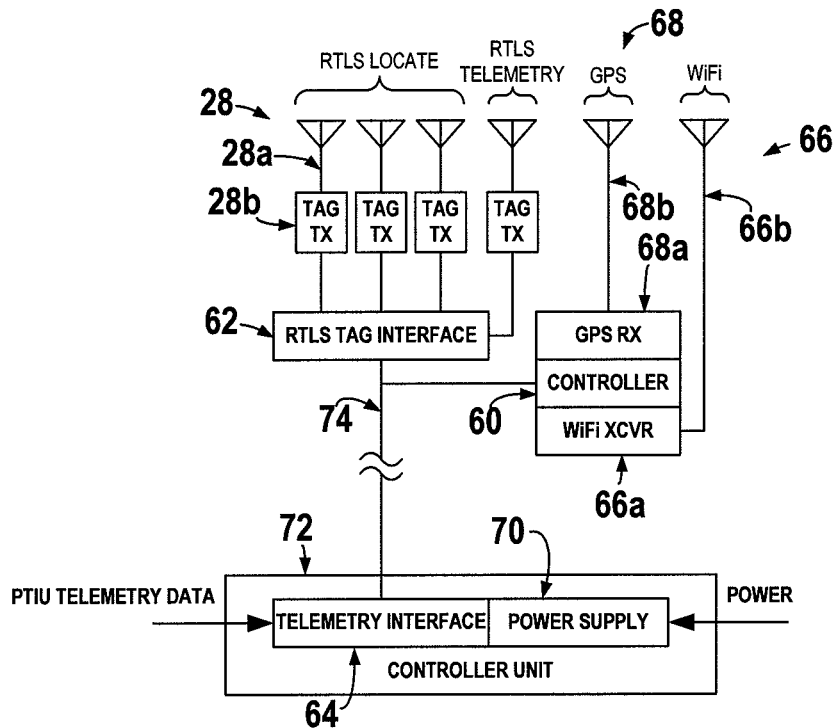
Figure 4:
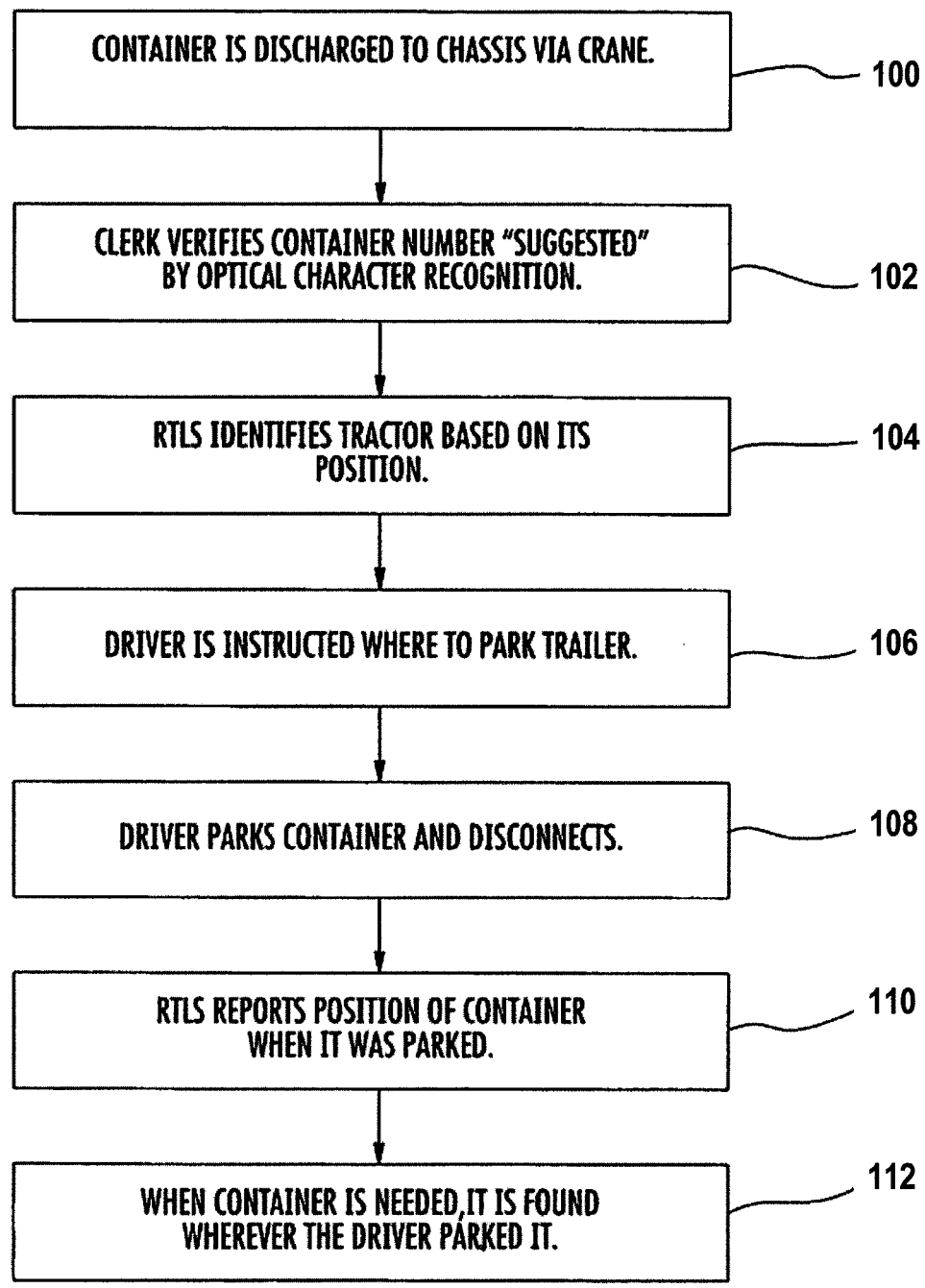
Figure 5:
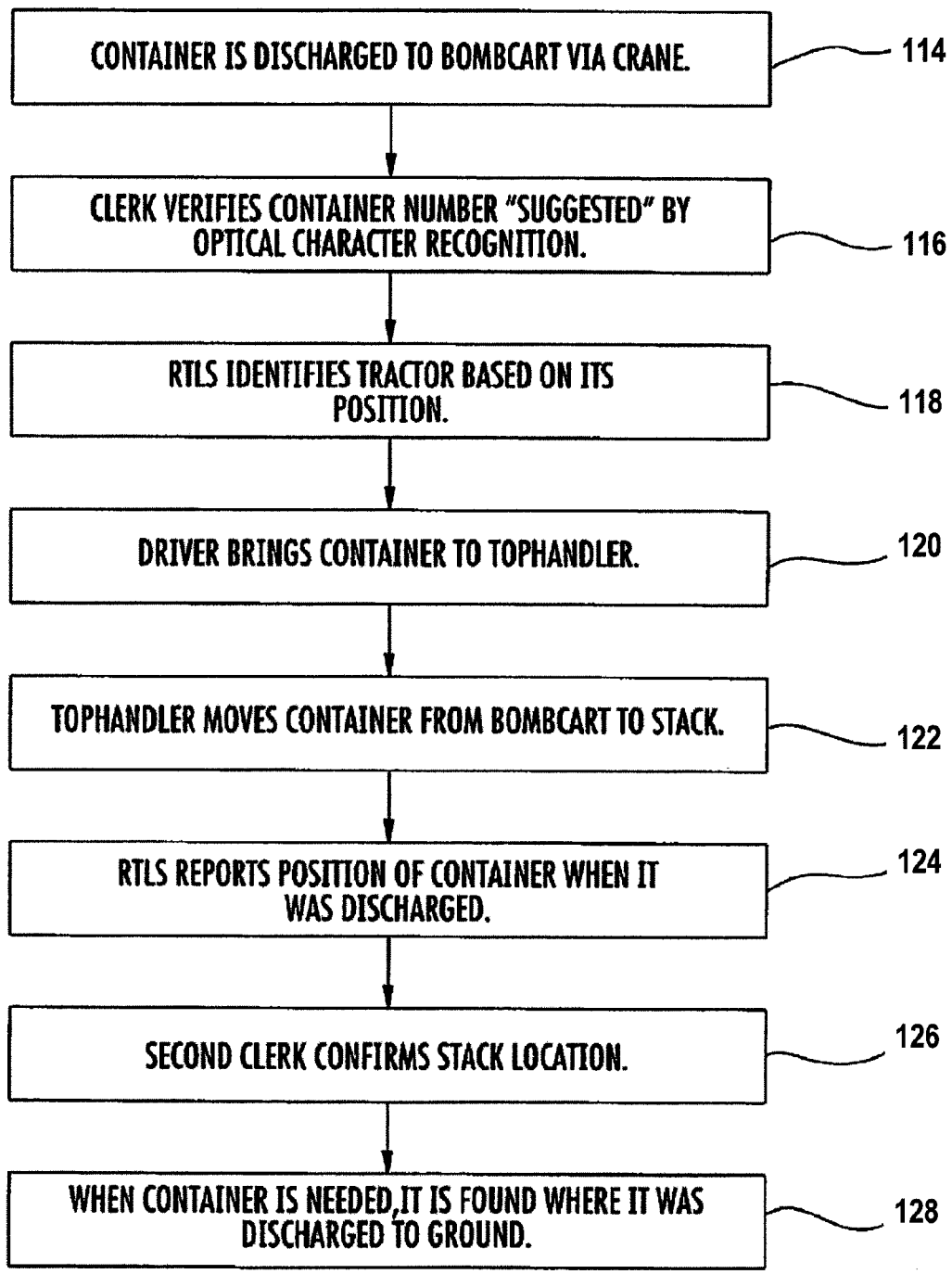
Figure 6:
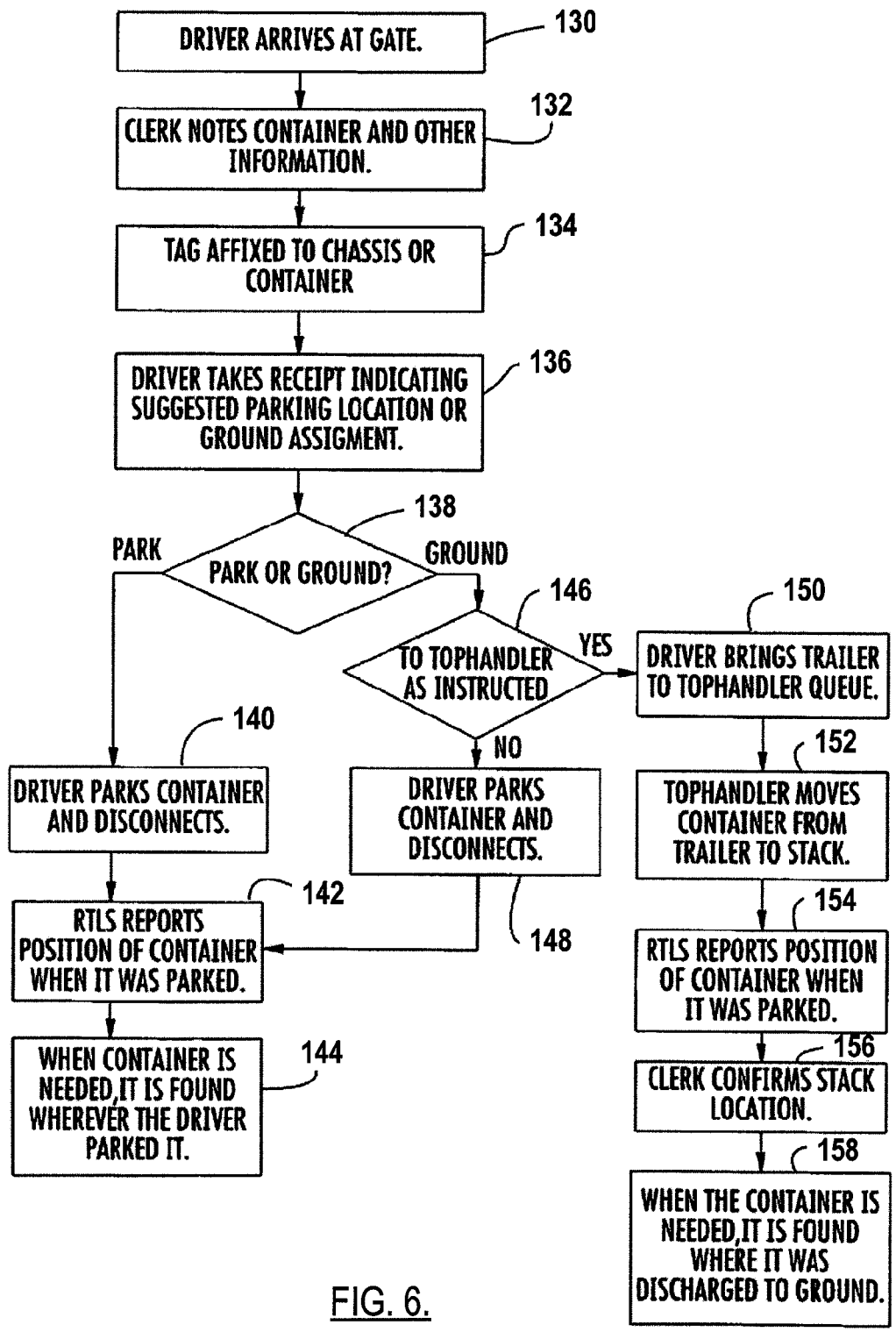
Figure 7:
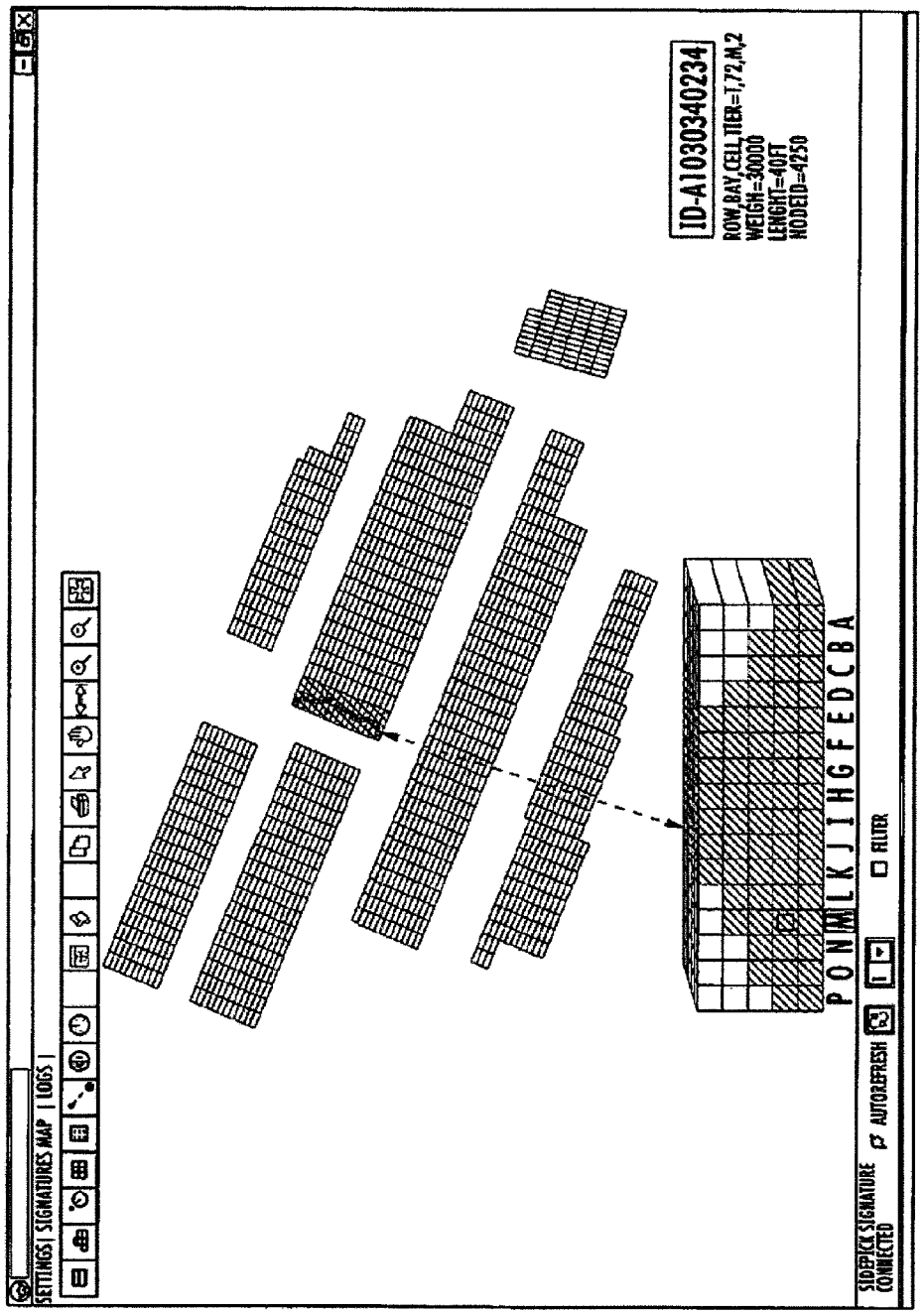
Figure 8:
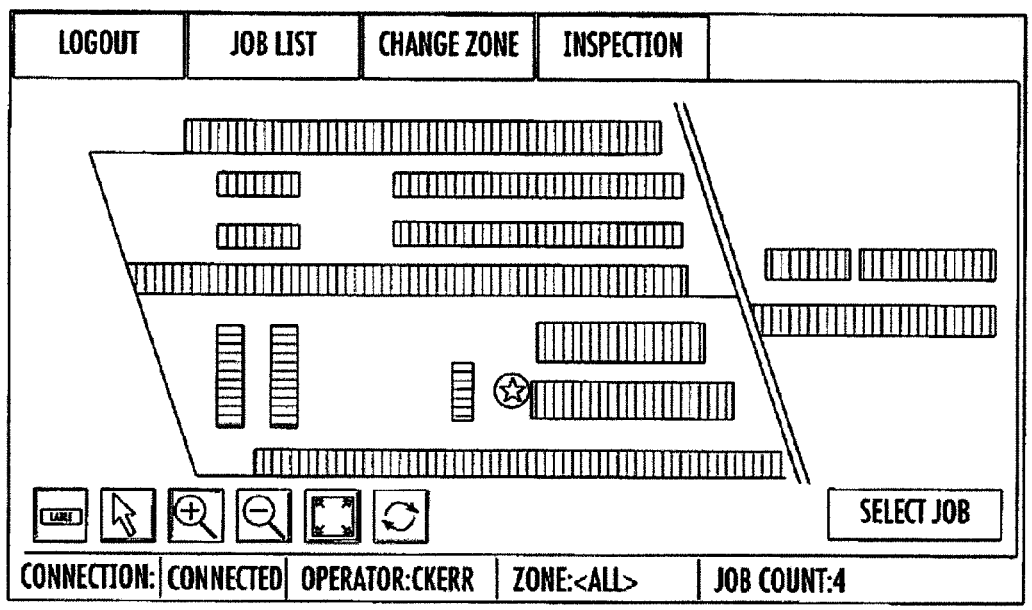
Figure 9:
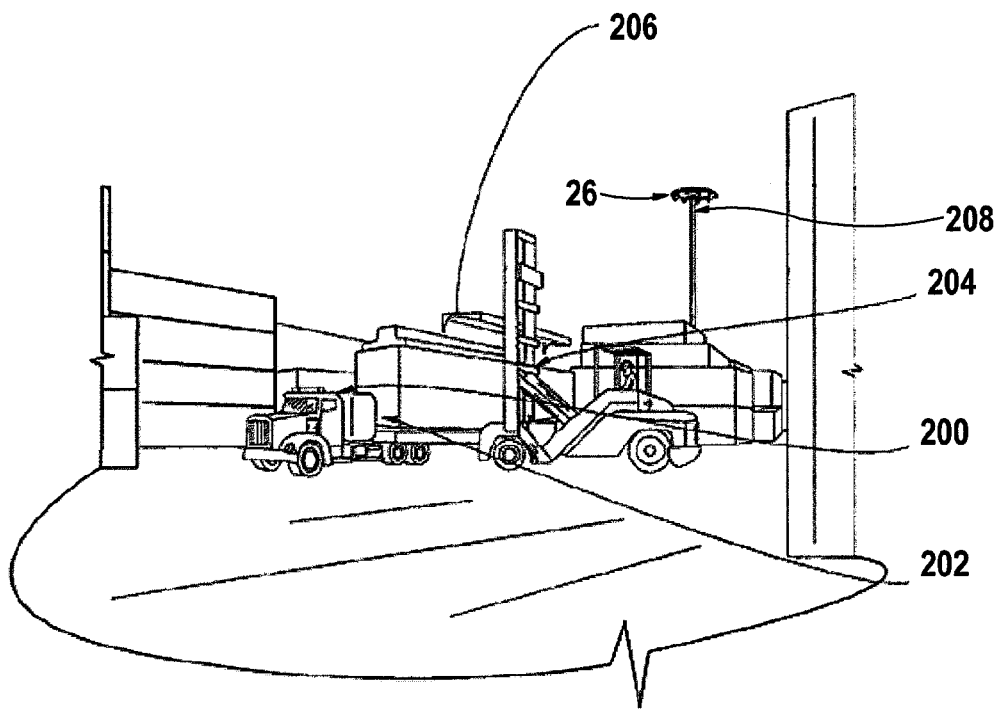
Figure 10:
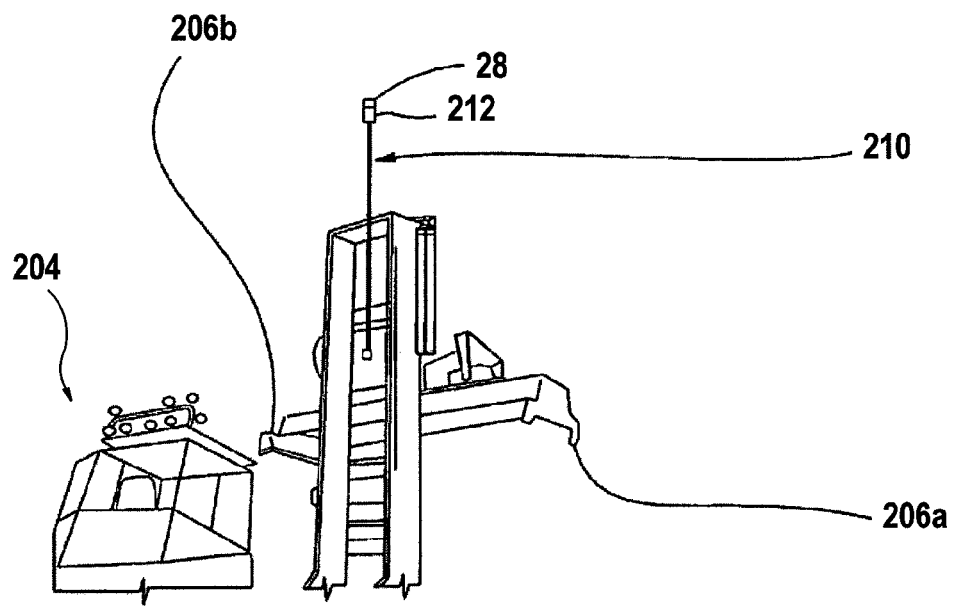
Figure 11:
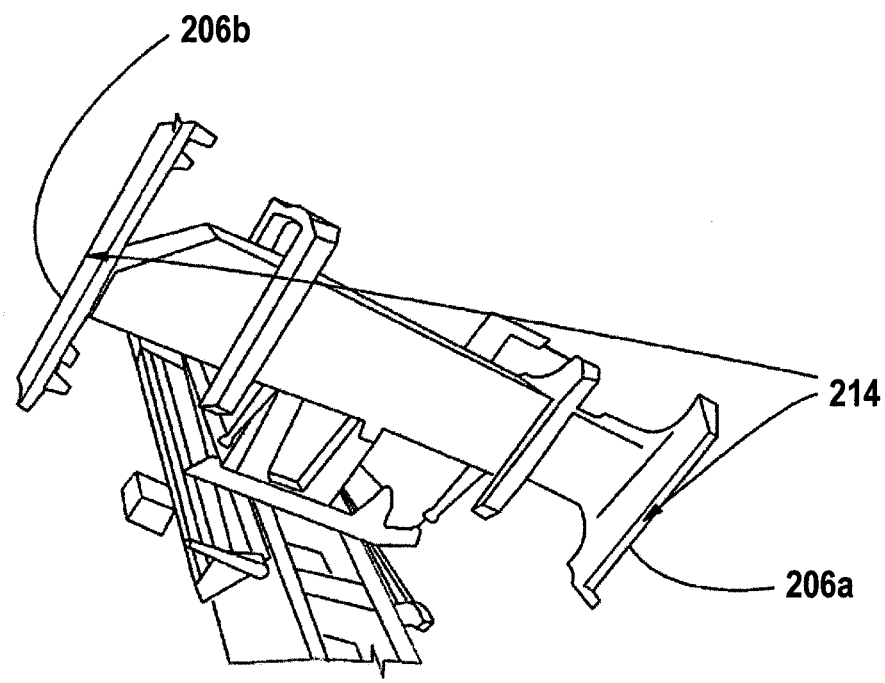
Figure 12:
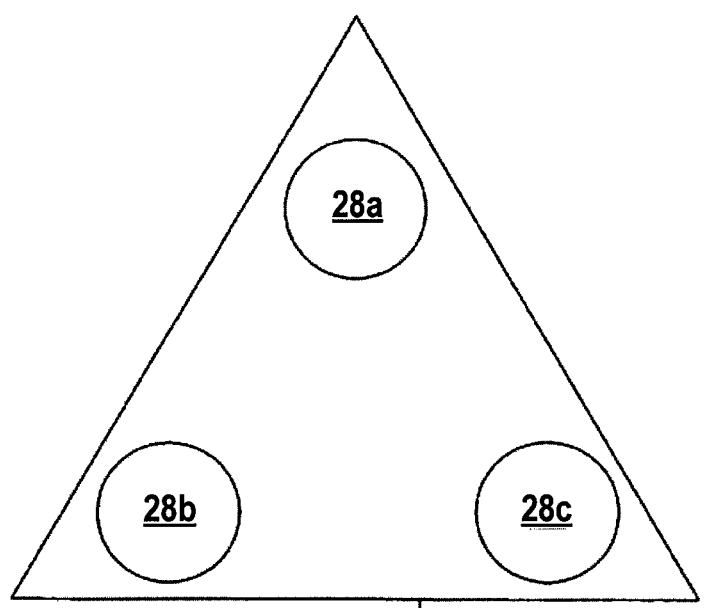

Having thus described the invention in general terms, reference will now be made to the accompanying drawings, which are not necessarily drawn to scale, and wherein:

FIG. 1 is a fragmentary, environmental view of a real-time locating system for locating containers in a marine terminal, according to one exemplary embodiment of the present invention;

FIGS. 2 and 3 are schematic block diagrams of one or more tags configured to interface with a position tracking interface unit at a mobile or fixed location within the terminal, according to exemplary embodiments of the present invention;

FIG. 4 is a high-level flow chart illustrating the steps used when a container is unloaded from a vessel to a chassis, according to one exemplary embodiment of the present invention;

FIG. 5 is a high-level flow chart illustrating the steps when discharging a container from vessel to ground, according to one exemplary embodiment of the present invention;

FIG. 6 is a high-level flow chart of an example of processing containers through a gate of the marine terminal, according to one exemplary embodiment of the present invention;

FIG. 7 is an example of a computer window as a graphical user interface for a container stacking console, according to one exemplary embodiment of the present invention;

FIG. 8 is an example of a computer window as a graphical user interface for a switcher user interface, according to one exemplary embodiment of the present invention;

FIG. 9 is an environmental view of a top-pick loader, drayage tractor and chassis with the top-pick loader unloading the container, according to one exemplary embodiment of the present invention;

FIGS. 10 and 11 are environmental views of portions of a top-pick loader and its gripper showing an antenna mast, according to one exemplary embodiment of the present invention; and FIG. 12 is a fragmentary plan view of a mounting plate for three tags located on top of the top-pick loader antenna mast, according to one exemplary embodiment of the present invention.

DETAILED DESCRIPTION OF THE INVENTION

Exemplary embodiments of the present invention now will be described more fully hereinafter with reference to the accompanying drawings, in which preferred embodiments of the invention are shown. Exemplary embodiments of this invention may, however, be embodied in many different forms and should not be construed as limited to the embodiments set forth herein; rather, these exemplary embodiments are provided so that this disclosure will be thorough and complete, and will fully convey the scope of the invention to those skilled in the art. Like numbers refer to like elements throughout.

The system and method of exemplary embodiments of the present invention can selectively use one or more of a number of different geo-spatial positioning systems for locating and tracking assets including, for example, real-time locating system (RTLS), satellite-based navigation system (e.g., global positioning system—GPS, differential GPS—DGPS, etc.) techniques or the like. Exemplary embodiments of the present invention will be primarily described in conjunction with locating and/or tracking containers in a marine terminal. It should be understood, however, that exemplary embodiments of the present invention can be utilized in conjunction with locating and/or tracking a number of other assets within a number of different types of geographic areas. More generally, for example, exemplary embodiments of the present invention can equally be utilized in conjunction with locating and/or tracking assets in the automotive, aerospace and defense, industrial manufacturing, health care, homeland security, or transportation and logistics industries (including in airports, marine terminals, transload facilities, rail yards, etc.).

The system and method of exemplary embodiments can use low-power radio transmissions to determine the location of radio-emission beacons, called tags or tag transmitters (more generally locating units of an appropriate positioning system, e.g., RTLS), attached to objects configured to move or facilitate movement of the tags. These objects may include, for example, an incoming trailer pulling containers on a chassis, a utility tractor rig (UTR), a transfer crane (transtainer) for loading flat containers, a drayage tractor, or top-pick loader (also termed a top pick, top-pick spreader, or top handler), sometimes generally referred to as container-handling equipment (CHE).

The tags may include a wireless transmitter configured to transmit radio frequency (RF) signals, including an ID (identifier) of the tag, to a fixed array of antennas in a surrounding environment. These antennas may be located at spaced-apart, different locations, and include receivers (and sometimes transmitters) and form at each location a Locating Access Point (LAP) or tag signal reader (also referred to as a Location Sensor). These LAPs may be configured to receive the RF signals. Each LAP may be connected to a processor or server by a wireless or wired local area network (LAN). The processor may be configured to determine the location of each tag using technology similar to GPS. For adding accuracy to the RTLS or providing a stand-alone solution separate from the RTLS, one or more LAPs and/or tags may include or be otherwise positioned and/or configured to operate with a satellite-based navigation system (e.g., GPS, DGPS, etc.) sensor unit (more generally a locating unit of a satellite-based navigation system). Important operational advantages may be achieved by tracking the location of container-handling equipment as it engages/disengages from a container. The system and method of exemplary embodiments may also track gate moves using a compact tag and provide real-time visibility to the container movements within the terminal.

A RTLS and method that can be modified for use in exemplary embodiments of the present application are described in commonly-assigned U.S. Pat. No. 6,657,586 and U.S. Patent Application Publication No. 2002/0181565, the contents of which are hereby incorporated by reference in their entireties. Similar, commonly-assigned patents include U.S. Pat. Nos. 5,920,287; 5,995,046; 6,121,926; and 6,127,976, the contents of which are also hereby incorporated by reference in their entireties.

As noted in the '586 patent, GPS can be used with a tag signal reader or LAP for added accuracy. Also, a port device (either separate or part of a LAP) may include circuitry operative to generate a rotating magnetic or similar electromagnetic or other field such that the port device may be operative as a proximity communication device that can trigger a tag to transmit an alternate (blink) pattern. The port device may act as an interrogator, and may be termed such. One example of such an interrogator is described in commonly-assigned U.S. Pat. No. 6,812,839, the content of which is incorporated by reference in its entirety. When a tag passes through a port device field, the tag can initiate a preprogrammed and typically faster blink rate to allow more location points for tracking a tagged asset, such as a vehicle hauling a container as it passes through a critical threshold, for example, a shipping/receiving backdoor or gate entry to a marine terminal. Examples of such tags, port devices, and LAPs are those sold under the trade designation WhereTag, WherePort and WhereLan by Wherenet USA of Santa Clara, Calif.

A system and method for tracking containers in a marine terminal in accordance with exemplary embodiments of the present invention is first described, followed by a more detailed explanation of a system and method for tracking containers in grounded marine terminal applications in accordance with more particular exemplary embodiments of the present invention.

The combination of the RTLS and one or more satellite-based navigation systems may provide one wireless infrastructure for all tagged assets such as containers, wheeled chassis, tractors, loaders, cranes, maintenance equipment, and other similar container-handling equipment. As explained herein, a system including the RTLS and/or one or more satellite-based navigation systems may be referred to as a "location system." This location system may provide real-time ID and location of one or more tags, may provide reliable telemetry to record events, and may provide mobile communications to work-instruction and data-entry terminals. Any terminal operating (management) software (TOS) can be optimized by real-time location and telemetry data to provide real-time, exact-slot accuracy of container ID and location, and real-time location and automatic telemetry of container events and container-handling equipment and other mobile assets. The location system may be applicable for basic container storage as stacked containers (grounded) and parked containers on a chassis (wheeled).

FIG. 1 is a fragmentary environmental view of a location system 20 for locating containers in a marine terminal in accordance with one exemplary embodiment of the present invention, and shows various applications of this location system. As shown, the location system may include a computer server 22 configured to operate with a terminal operating system (TOS) 24. The server and TOS may each comprise a computer system including a processor, memory (volatile and/or non-volatile memory) and/or user interface (e.g., display, keyboard, etc.). As shown, the server and TOS are separate from one another. It should be understood, however, that the server and TOS may be co-located, but logically separate, within the same apparatus.

The server 22 and TOS 24 may provide a visibility software suite and marine module with a bidirectional TOS interface that may be operative with various LAPs 26. The server may also provide processing for receiving data signals from the LAPs that have received wireless signals from tags 28, where these data signals may include signals or pulses ("blinks") used for RTLS location determination. One or more of these data signals from the LAPs may additionally or alternatively include satellite-based navigation system sensor data, which may be received by properly-equipped tags from one or more satellites 29 and/or in various instances from a reference satellite-based navigation system sensor unit 31 of an appropriate satellite-based navigation system (e.g., DGPS). As shown, the reference sensor unit may be positioned at a known, fixed location, and may include a satellite-based navigation system receiver (REF RX) 31a coupled to an antenna 31b.

The server 24 in this example may be configured to function as a location processor for locating a tag (e.g., positioned on CHE). In the context of the RTLS, locating the tag may include determining which tagged signals are first-to-arrive signals and conduct differentiation of first-to-arrive signals relative to the location of LAPs (known or otherwise determinable, for example, by an appropriate satellite-based navigation system). And in the context of the satellite-based navigation system, locating the tag may include calculating or otherwise determining satellite-based navigation system location data from the sensor data. This location data may be expressed in any of a number of different manners, such as in accordance with an appropriate geographic coordinate system (e.g., latitude-longitude—LL, latitude-longitude-altitude—LAA, north-east-down—NED, etc.).

As also shown, a LAP 26 may be configured to operate as an access point with WiFi 802.11 Standards, and the tag 28, reference satellite-based navigation system sensor unit 31, and LAP (as a tag signal reader) may be configured to operate according to ANSI 371.1, ISO 24730 Standards or similar standards utilizing a 2.4 GHz air interface. It should be understood, however, that the LAPs, tags and/or reference sensor units may operate in accordance with a number of other standards. For example, similar to the LAP, a tag and/or sensor unit may also be configured to operate according to WiFi 802.11 Standards.

Relative to a gate position, the marine terminal may include one or more gates 34 configured to operate with or otherwise include one or more optical character recognition (OCR) terminals 36. A tag 28 may be positioned at the gate to improve OCR events and track containers to wheeled 38 and/or grounded 40 positions of the marine terminal. The OCR terminal may include one or more OCR cameras 42. The tag placement options are shown as on a drayman's truck (terms such as "truck," "trailer" or the like being used interchangeably throughout) 43, trailer chassis 44 or container 46. As used herein, terms such as "truck," "tractor" or the like may used interchangeably, as may terms such as "trailer," "chassis" or the like (although a chassis may in fact form a part of a trailer).

Relative to a grounded position 40, a port device 50 is shown, for example, positioned on the illustrated crane 52. The tag updates of a wheeled container in the wheeled position 78 may be operative such that no mobile inventory vehicle, magnet or clerk update is required. The server 22 and TOS 24 may also provide a user interface for a wheeled location update as illustrated.

Relative to a vessel position 54, a tag 28 may be located with an OCR camera 42 for vessel unloading at a maritime crane 56. It should be understood that the tags can be used to upload maintenance and other information from the vehicle, such as hours of operation, fuel levels or the like.

A telemetry unit or other position tracking interface unit (PTIU) 58, may be configured to transmit sensor data through the tag 28 (or a separate WiFi unit, as explained below), and may report to the location system 20 when a chassis/container is disconnected from a tractor, such as when the driver parks the chassis/container or other similar events. One example of such a telemetry unit is the Vehicle Communicator (VCOM) unit manufactured by FMC Airport Systems of Ogden, Utah. The PTIU may report to the location system when a chassis/container is disconnected from a tractor, such as when the driver parks the chassis/container. The PTIU or other telemetry unit may transmit data from different sensors on the tractor, for example, a proximity sensor on the king pin, a pair of hydraulic sensors on the fifth wheel, and a reverse sensor as non-limiting example. Data from these three sensors may indicate when a container is engaged or disengaged. Other sensors may be monitored to determine an operator ID, collisions, fuel levels, usage statistics, and maintenance information that can be used to improve operational efficiency.

In the different systems for processing containers through the marine terminal, the location system 20 may continuously track the location of containers, such that the containers can be found more easily. Each LAP 26 and the server 24 or a separate unit may include any one or more of a number of different LAP and location processor hardware, software and/or firmware, to locate a tag or other transmitter generating a tag or comparable signal. In the context of RTLS location determination, for example, this hardware, software and/or firmware may include circuitry configured to determine any timing matters, set up a correlation algorithm responsive to any timing matters, determine which tag signals are first-to-arrive signals and conduct differentiation of first-to-arrive signals to locate a tag or other transmitter generating a tag or comparable signal. In this regard, LAP circuitry may be configured to "read" an associated "blink" used for location determination signals, such as signals emitted from a tag transmitter to a LAP. Location processor circuitry, on the other hand, may include a correlation-based, RF signal processor circuit configured to receive and process the output of LAP circuitry from a number of different LAPs to thereby determine location based on that output, such as in accordance with a multi-lateration technique. For an example of such circuitry, see U.S. patent application Ser. No. 11/201,956 (published as U.S. Patent Application Publication No. 2006/0220851), the content of which is hereby incorporated by reference in its entirety.

In the context of satellite-based navigation system location determination, on the other hand, each LAP 26 and server 22 or separate unit may include hardware, software and/or firmware configured to determine receive sensor data from one or more satellites 29, and pre- and post-process that data to calculate or otherwise determine satellite-based navigation system location data (e.g., location coordinates) from the sensor data. In this regard, for a particular, properly-equipped tag 28, the server may implement or otherwise operate under control of a computational engine (implemented in software, for example) to receive and process sensor data from at least the tag at respective epochs to thereby locate the tag at those epochs. In various exemplary embodiments, data caching and/or more permanent recording (data storage) may be utilized at the tags and/or LAP to improve system performance, such as by improving telemetry efficiency by avoiding packet collision on the backhaul while also accommodating temporary disruption. Data storage may also support data post processing for diagnostics. In instances in which data caching and/or recording is utilized, cache sizes may be configured so as to account for non-event (or non-transaction) location latency and backhaul packet size. Location latency of material events (or transactions), however, may be reduced or otherwise minimized by "fast forwarding" through the data (i.e., rapidly processing cached data up to the time of an event).

In one particular exemplary embodiment in which the satellite-based navigation system comprises a DGPS, for example, the server may receive sensor data (e.g., raw GPS range records) from the both the tag and reference sensor unit 31 at respective epochs (specific instances in time), and process that data in accordance with a DGPS technique to locate the respective tag. One exemplary computational engine suitable for use by the server of exemplary embodiments is the RtDLL computational engine available from Waypoint Consulting (NovAtel) of Calgary, Alberta, Canada. This RtDLL computational engine, in turn, may operate in conjunction with real-time GPS processing software with a graphical user interface, such as RTKNav also available from Waypoint Consulting. In the aforementioned and other exemplary embodiments, the location points (location data) determined from the signals generated by the tags 28 can be transformed into a local map datum. The "blink" or tag service may provide scaling, translation and/or rotation of the RtDLL NED output.

Reference is now made to FIGS. 2 and 3, which illustrate schematic block diagrams of one or more tags 28 configured to interface with a PTIU 58 at a mobile or fixed location within the terminal, according to exemplary embodiments of the present invention. As indicated above, tags may be placed at any of a number of different locations within the terminal. The exemplary embodiments of FIGS. 2 and 3 may be particularly configured for placement on CHE (container handling equipment), although it should be understood that these embodiments may be equally placed at other locations within the terminal.

As shown in FIGS. 2 and 3, the tag 28 may include a tag transmitter 28*a* (tag TX) coupled to an antenna 28*b*, and may be configured to operate at least partially under control or direction of a controller 60, which may include a processor and memory. As shown in FIG. 3, the controller may be configured to at least partially control or direct operation of not just one but multiple tags (three tags being shown, for example, in FIG. 3), which may facilitate if not ensure instantaneous location accuracy. In such instances, the controller may interface with each of the tags directly, or via an appropriate tag interface 62.

The controller 60 may also be configured to control or direct transmission of sensor data as or with other telemetry data from a PTIU 58, and may interface with the PTIU via an appropriate telemetry interface 64. As shown, telemetry data (including sensor data and/or other telemetry data) may be transmitted in any of a number of different manners. For example, telemetry data may be transmitted via one of the tags used to perform a RTLS locate (FIG. 2), or via a dedicated tag (FIG. 3, shown as RTLS telemetry). Additionally or alternatively, for example, telemetry data may be transmitted via a WiFi unit 66 (including a WiFi transmitter or transceiver 66*a*—WiFi XCVR—including a transmitter and receiver, and antenna 66*b*), also configured to operate at least partially under control or direction of the controller.

In addition to tag(s) 28 and WiFi unit 66, the controller 60 may be configured to control or direct operation of a satellite-based navigation system sensor unit 68, which may be positioned with the tag(s). Similar to the tag(s) and WiFi unit, the satellite-based navigation system sensor unit may include a satellite-based navigation system receiver 66*a* (shown, for example, as a GPS receiver—GPS RX) coupled to an antenna 66*b* for receiving signals from one or more satellites. These signals (sometimes more generally referred to as satellite-based navigation system sensor data) may then be transmitted to the server 24 and TOS 22 via the tag or WiFi unit (and an LAP 26) in a manner similar to the aforementioned telemetry data (as explained herein, telemetry data transmitted via a tag or WiFi unit may include satellite-based navigation system sensor data). The server, then, may calculate or otherwise determine satellite-based navigation system location data (e.g., location coordinates) from the sensor data. As indicated above, and explained further below, this satellite-based navigation system sensor unit may be used for adding accuracy to the RTLS or provide a stand-alone solution separate from the RTLS.

The components or elements shown in FIGS. 2 and 3 may be powered by a power supply 70, which may be coupled to an external power source, such as that of a CHE on which the components may be positioned. This power supply may be located within a controller unit 72 that may include one or more other components. As shown in FIG. 2, for example, the controller unit 72 may additionally include the power supply, the controller 60, telemetry interface 64 and WiFi transceiver 66a. Alternatively, as shown in FIG. 3, the controller unit may just additionally include the telemetry interface. Outside the controller unit, the other components shown in FIGS. 2 and 3 may be positioned proximate one another, and in various exemplary embodiments, may be supported by an antenna mast (shown schematically at 74).

The controller 60 may control or direct the tag(s) 28, WiFi unit 66 and satellite-based navigation system sensor unit 68 to perform a number of different functions as explained herein. In addition to generally controlling performance of these functions, however, the controller may further control the form of and/or timing of data transmitted from at least one or more of the tag(s) or WiFi unit in a manner that accounts for the wireless link between the tag(s) or WiFi unit and respective LAPs 26 (that link by extension also being between the tag(s) or WiFi unit and the server 22 or TOS 24), such as to thereby reduce the effect of any disruption of one or more wireless links from the tag(s) or WiFi unit, and/or reduce the amount of data transmission required for a given amount of available data bandwidth.

More particularly, although the controller 60 may be configured to direct transmission of data from the tag(s) 28 and or WiFi unit 66 as that data becomes available, the controller may instead cache, or otherwise collect and compile, data for one or more epochs over a data collection period before directing its transmission, where this data collection period may be defined based on a period of time or for a number of readings or measurements of a particular piece of data (e.g., GPS location coordinates or location fixes at respective epochs). The controller may then direct transmission of the compiled data instead of the individually-collected data to thereby reduce overhead (headers, encryption, error correction, etc.) that may be associated with each data packet generation and transmission.

Additionally or alternatively, for example, the controller 60 may be configured to direct transmission of the received and compiled (if so desired) data at random or pseudorandom time periods to thereby at least partially optimize bandwidth usage (noting that the terminal may include several similar controllers controlling operation of other, similar components). In various instances, however, the controller may be triggered to direct transmission of the data independent of a random/pseudorandom time period, such as in response to a query from the server 22 or TOS 24, or in response to detection of an event based on data received by the controller (e.g., detecting when a chassis/container is disconnected from a tractor). In such instances, this triggered transmission may receive priority over any random/pseudorandom transmissions.

Further, for example, the controller 60 may be configured to compress and/or store or otherwise buffer received data in memory. In this regard, the controller may compress redundant data such as when no movement of the asset (e.g., CHE) on which the components may be positioned is detected over a data collection period. Additionally or alternatively, the controller may replace a larger set of data with a smaller set of data from which the larger set of data is determinable or approximable (capable of being approximated), such as by replacing a set of location coordinates for a route (point-to-point movement data) with velocity, acceleration and/or geometry data for that route (route shape).

As suggested above, the controller 60 may store or otherwise buffer the received data to facilitate its compilation and random/pseudorandom transmission. Additionally, however, the controller may be triggered to store or buffer the received (and possibly compressed) data when an established wireless connection with an appropriate LAP 26 is lost (wireless link broken). In such instances, the controller may continue to receive (and possibly compile and/or compress) and store data until the wireless connection is re-established (or another wireless connection is established with the same or another LAP). The controller may then transmit the stored data to the respective LAP (and on to the server 24 or TOS 22) using the re-established or newly-established wireless connection.

Reference is now made to FIG. 4, which is an example of a high-level flow chart illustrating how the location system 20 can be used when a container is moved from a vessel position 54 to a wheeled position 38, according to one exemplary embodiment of the present invention. In various exemplary embodiments (including those shown in FIGS. 4, 5 and 6), one or both of RTLS or the satellite-based navigation system may be used, selectively or otherwise. As shown, a container may be discharged to a trailer connected to a truck via a crane 56 (block 100). A clerk may verify the container number "suggested" by OCR—captured by OCR camera(s) 42 (block 102), although OCR is not required or desired in some instances. The location system may identify the truck based on its position (block 104). A driver can be instructed where to park the trailer (block 106). The driver may then park the container and disconnect from it (block 108). The location system may report the position of the container when it is parked (block 110). When the container is needed, it may found wherever the driver parked it (block 112).

FIG. 5 is an example of a high-level flow chart illustrating how the location system 20 can be used when a container is moved from a vessel position 54 to a grounded position 40, according to one exemplary embodiment of the present invention. As shown, the container may be discharged to a bomb cart connected to a truck via a crane 56 (block 114). A clerk may verify the container number "suggested" by OCR—captured by OCR camera(s) 42 (block 116), although OCR is not required or desired in some instances. The location system may identify the truck based on its position (block 118). A driver may then bring the container to a top-pick loader (block 120), which may move the container from the bomb cart to a stack of containers (block 122). The location system may report the position of the container when it is discharged from the bomb cart (block 124). Another clerk may confirm stacked location (block 126). When a container is required, it may be found where it was discharged to ground (block 128).

The location system 20 for tracking containers in a marine terminal can also be used when processing containers through a gate 34 of the terminal, which may involve similar issues in moving containers from a vessel position 54 to a wheeled position 38, and from a vessel position to a grounded position 40. Drivers entering through a gate may be instructed to park a chassis/container (wheeled position) or to discharge the container to ground (grounded position). A large number of trucks and connected trailers enter from the outside, and some drivers and equipment do not always belong to the terminal and are not permanently tagged. As shown in the example high-level flow chart of FIG. 6, additional step(s) can be added for check-in. A temporary tag can be affixed to a trailer chassis or container as it enters the gate.

As illustrated, as a driver arrives at the gate 34 (block 130), a clerk may note the container and other information (block 132). A tag 28 may be affixed to the trailer's chassis or the container itself (block 134), and the driver may take receipt indicating the suggested parking location or ground assignment (block 136). A determination may be made whether it is parked or grounded (block 138). If the determination is made to park the container, the driver may park the container and disconnect from it (block 140). The location system 20 may report the position of the container when it was parked (block 142). When the container is required, it may found wherever the driver parked it (block 144). If a decision at block 138 was made for a grounded container, a determination may be made whether the container went to the top-pick loader as instructed (block 146). If not, the driver may park the container and disconnect from it (block 148) and the process may continue such that the location system reports the position of the container when it was parked (block 142).

If the top-pick loader was instructed at block 146, the driver may bring the trailer to a top-pick loader queue (block 150). The top-pick loader may move the container from the trailer to a stack (block 152). The location system 20 may report the position of the container when it was parked (block 154). The clerk may confirm the stacked location (block 156). When the container is required, then, it may be found where it was discharged to ground (block 158).

The infrastructure, tracking devices and software as described herein can support the tracking of CHE (container-handling equipment) and third-party tractors via a gate 34 to enable an automated hand-off of the container ID to a TOS 22. The location system 20 may support an automated update of the grounded position 40 of a container in the terminal, whether it is delivered by a truck or UTR (utility tractor rig) to system-enabled Front-End Loaders (FEL). A flow process for a drayman for gate to ground (see, e.g., FIG. 6) may include a permanent or temporary mount tag 28 on the drayman tractor or chassis. This tag may be triggered by a port device 50 as the trailer chassis passes through an optional OCR terminal 36, which may automatically associate the tagged ID to an OCR record.

A port device 50 may be located in each gate lane of the gate 34 for automatic tag/event association and could assign an OCR terminal event to the correct lane. A FEL may have a port device 50 that forces the drayman or chassis tag to transmit its ID, and the associated container ID may be automatically transferred to the FEL. This may be tracked until the container is grounded. A PTIU 58 or similar telemetry unit may collect sensor data and transmit it as or with other telemetry data via the FEL's tag (or a separate WiFi unit) in a manner described before. Sensor data may be received, and the X, Y position for the FEL tag may be determined, upon container disengage. At the marine terminal server 24, the location of the sensor data may be translated to a bay, cell and tier position and updated to the TOS 22.

For a gate-to-wheels scenario (gate position 34 to wheeled position 38), the location system 20 may compare a park instruction with a park signature created by a drayman visiting the marine terminal. For example, a permanent or temporary tag 28 may be located on the drayman's tractor or chassis and the tag read by the port device 50 as the drayman passes through an optional OCR terminal 36, which may automatically associate the tag ID for an OCR record. A port device may be located at each gate lane at the gate 34 for automatic tag/event association and assigning the OCR terminal event to lanes. The processing for the container may be learned by querying the TOS 24, tracking the container, and monitoring it to ensure a grounded instruction is adhered. The drayman may leave the container in the chassis or bear the chassis into the marine terminal. The tag's position may be automatically determined with no need for a mobile-inventory vehicle or magnet retrieval. A wheeled position may be updated to the TOS.

The location system 20 may also be operative for a vessel or rail-to-ground and support an automated association of the container ID at the vessel for tracking a container ID to a wheeled or grounded position 38, 40 in the yard of the marine terminal. The container ID may be associated to the UTR in this scenario. For example, a quay crane 52 OCR or rail OCR terminal can be used to automatically capture a container ID, and the container and UTR may be automatically associated based on a UTR sensor sweep and location. A port device on a transtainer and a UTR tag may automatically transfer ownership of the container to the transtainer. The transtainer may be located, and the container disengaged, to determine an X, Y position. Other sensors, for example, operative with the PTIU 58 may be used to determine a Z position, as explained in greater detail below. The transtainer disengaged location may be translated to a bay, cell, tier position, or other position for the container and updated to the TOS 24.

The system as described can also be used for vessel or rail-to-wheels in which the quay crane OCR or rail OCR terminal may automatically capture the container ID. The container and UTR may be automatically associated based on a UTR sensor sweep and location. The UTR's location may be recorded upon chassis disengage; and the UTR may be, and may be automatically shown as being, available for its next assignment. The UTR's disengaged location may be translated to a row or slot position for the container and updated to the TOS 24.

The PTIU 58 may be located on UTRs, side handlers, top-pick loaders, reach stackers, straddle carriers, Rubber Tire Gantry (RTG) cranes and other CHE (container-handling equipment), and may transmit equipment sensor data through the tags 28 (or separate WiFi units) into the location system 20 for processing by the server 24. Sensor transmissions may be simplified by providing a common platform for the CHE. The PTIU may monitor what equipment is moving, who was using the equipment (with operator logon), what the equipment is doing, such as idling or moving a container, and other diagnostic data, such as fuel level while the equipment is in operation. The PTIU (or a controller 60 interconnected between the PTIU and one or more tags 28) may respond to events allowing the location system to update what that specific equipment did when the PTIU sends data to a tag (directly or via the controller). For example, when the operator of a RTG crane moves the RTG spreader, no events may be sent to the location system.

When an operator locks the spreader on a container, however, the PTIU may send this event data to the location system because it affects the location of container inventory.

The PTIU 58 may monitor any required sensors and may respond (or controller 60 connected to the PTIU may respond) to correct events that affect container inventory. For example, for a top-pick loader or RTG crane, the events of locking onto a container and moving the container may be similar, although sensors sense this as different. For a UTR, the monitored may could be the fifth wheel being engaged/disengaged and the presence of a container. As will be appreciated, events and sensors used by the system may be different depending on the CHE.

Generally, the PTIU 58 (or controller 60 interconnected between the PTIU and one or more tags 28) may detect an event in any of a number of different manners, such as based on an event signature defined based on measurements (or range of measurements) from each of a number of sensors. If so desired, the controller (or the server 22 or TOS 24) may be further configured to verify a detected event, or provide stand-alone event detection, based on a verification signature defined based on data received by the controller for a period of time, such as for a period of time before detection of an event (for event verification). This signature may include, for example, speed and/or acceleration values (or ranges of values) for the asset (e.g., CHE) on which the tag(s) and other components (PTIU, controller, satellite-based navigation system sensor unit 68, etc.) may be positioned, and may additionally or alternatively include the route traversed by the tag(s) over that period of time (tracked based on the location of the tags at a number of instances over that period of time). In this regard, the controller (or server or TOS) may be generally capable of using the determined location of a tag (or more particularly in various instances, the satellite-based navigation system sensor unit positioned proximate the tag) to replay a route traversed by the tag over a period of time (this route sometimes being referred to as a "snail trail"). The time between location determinations (or location fixes) of the tags provides a granularity and may be set or otherwise adjusted at the direction of the controller (alone or at further direction of the server or TOS), such as by decreasing the time between location fixes to increase the accuracy of the snail trail of the tag. Further, if so desired, this snail trail may be utilized to determine bearing data that may replace or otherwise supplement (over-determine) readings or measurements from a magnetic compass.

The server 22 as a location processor may include appropriate software to process data received from the PTIU 58, such as to provide an open computer window corresponding to a signature processing console for each type of CHE located in the marine terminal. A new position for a container can be translated from an X, Y, Z position in the terminal to a row, bay, cell and tier position and passed through the TOS 24. An example of an open computer screen window for a container stacking console is shown in FIG. 7, showing a layout of different container positions in the top portion of the window and an isometric representation of stacked containers in the lower portion, as selected and indicated by the dashed lines. Location information may also be shared with UTR drivers or other operators of CHE and a user interface could be leveraged with a switcher user interface as shown in FIG. 8.

As noted before, the location system 20 may be configured to identify ISO containers arriving at the marine terminal with port devices 50, and to locate these containers when they are stored on flat trailers or chassis in the main staging yard as wheeled operations. The containers may arrive through a main gate and be scanned by port devices, arrive by rail and loaded by transtainers, or arrive by ship and loaded by cranes onto a UTR-pull chassis in a similar process to a rail process. These "wheeled" containers may be parked in the yard, for example, by the incoming drayage driver (drayman), or by a longshoreman hosteller (UTR) driver. The location system may maintain a constantly-updated ID and location record of all wheeled containers located in the yard.

A number of wheeled operations may use a tagged chassis. Containers arriving into the yard on non-owned chassis may be off-loaded by a top-pick loader and stacked on the "ground" so that the outside drayman can take the chassis as it leaves. FIG. 9 shows a drayage tractor 200 having a tag, and a marine terminal-owned chassis 202 with a tag. The top-pick loader is illustrated at 204 with a horizontal gripper 206 (sometimes referred to as a "spreader") for grabbing containers, and the LAP is shown generally at 26. An antenna mast 208 supports the LAP, which may include a satellite-based navigation system (e.g., GPS, DGPS, etc.) sensor unit. The ID and location of each container in the "grounded stack" to its exact position in X, Y, Z coordinates may be determined, particularly when there are many stacked containers.

Although it is possible to include tags on containers, the system and method in accordance with one exemplary embodiment of the present invention may infer the location of the containers from real-time association with the CHE (e.g., top-pick loader), which may place and remove the containers from the grounded stack and carrier chassis. And because it is generally desirable to achieve increased accuracy of the location of the handler, the typical RF emission from the handler tag may be structured so as to be line-of-sight (LOS) with the existing infrastructure of the location system 20. This may be accomplished using a separate antenna mast on the handler to rise above the top plane of the stacked containers. For example, an existing 18-foot fiberglass antenna mast may be used for vertical diversity on yard light poles in the marine terminal. The containers may be high and the mast may be set up so as to clear the surrounding structure of the loader. Some mechanical flexibility may be provided on the top-pick loader for overhead obstacles, such as maintenance garage doors and overhead utilities and conveyors. A satellite-based navigation system (e.g., GPS, DGPS, etc.) sensor unit may also be supported by the mast to provide additional location ability and redundancy overlay.

In various exemplary embodiments of the present invention, the location system 20 may be configured to selectively utilize the RTLS or satellite-based navigation system, or utilize both of the RTLS and satellite-based navigation system, to enhance location-system accuracy. Generally, the system may be configured such that the RTLS may be used, or both satellite-based navigation system and RTLS may be used, when the satellite-based navigation system is fully or partially blocked. Conversely, the satellite-based navigation system may provide location when the RTLS is fully or partially blocked.

More particularly, the RTLS and satellite-based navigation system may be loosely coupled such that the location system 20 selectively uses data from either the RTLS or satellite-based navigation system. In such instances, use of one technique or the other may be predefined by defining zones in the coverage area where one technique may provide more accurate data over the other technique. Alternatively, the RTLS and satellite-based navigation system may be tightly coupled such that the system combines use of both the RTLS and satellite-based navigation system, such as in accordance with various over-determination algorithms.

FIGS. 10 and 11 show two views of portions of a top-pick loader 204 having an antenna mast 210 (e.g., 18-foot antenna mast) for supporting one or more tags 28, and if so desired, a satellite-based navigation system sensor unit 212. This antenna mast may, for example, be mounted and extend upward from the highest fixed location on the top-pick loader. The mast may include an upward hemispherical pattern with minimized radiation below the horizon of the counterpoise of the mast, and may be long enough for a particular rise (e.g., two-foot rise) above the plane of highest container stack.

One or more port devices 50 as interrogators may be mounted on the top-pick loader for scanning tags, such as those positioned on the tractor 200 and/or carrier chassis 202. The port devices may be mounted, and the mounting points 214 located, at the top-pick loader's gripper 206. In this regard, the port devices may be mounted, and the mounting points located, at each end of the top-pick loader's gripper 206a, 206b so as to account for an unknown orientation to the tagged end of a container on a chassis. The port devices may be mounted under end plates of the gripper to prevent damage from adjacent containers during placement and removal operations from the stack. The port devices 50 on the top-pick loader may include different circuits and structural functions such as, for example, one or more of the following: (a) pot and shock mount electronics; (b) a separate antenna; (c) a flexible connection cable to the ends of the gripper (flexible enough to accommodate an appropriate-sized—e.g., 20-40 foot—container; (d) a weather shield; (e) damage protection; or (f) verify port device coverage in the environment.

A PTIU 58 or similar module may be connected to one or more sensors on the top-pick loader 204 to determine or otherwise indicate the placement of a container, the release of a container, and the height of the gripper 206 when an action occurs (Z-dimension value). This information may be sent as or with telemetry data from the PTIU using the tag 28 (or a separate WiFi unit) to simultaneously associate the top-pick loader's location with the data for the event. In this regard, a port device 50 as an interrogator may induce the blink from the chassis tag and/or the drayage tractor tag to associate the container ID with the data from the handler (CHE—e.g., top-pick loader) tag.

Both magnetic compass and inertial navigation techniques can be used for optimization of loader position information. In various instances, however, readings or measurements from the magnetic compass may be replaced or otherwise supplemented (over-determined) with bearing data that may be included within or otherwise determined based on data from the RTLS or satellite-based navigation system. Application-specific location algorithms can be used for one or more of the following: (a) X, Y, Z location of all containers in the grounded stack and zone location when not in stack; (b) discerned placement and removal operations from the stack; (c) associated tags on the chassis and/or drayage tractor, and therefore, a container ID with containers placed or removed by top-pick loader; or (d) the associated three tags in a tag set, which are tied to each top-pick loader event for improved location accuracy, allowing blinks to be sent in less than a 1.5 second window. Application software can be used for location of all containers in the grounded stack and stored in the asset manager, and an isometric display of container in exact current form stack from planar map zoom.

Because the handler (CHE—e.g., top-pick loader) may move quickly, the handler may include more than one tag, that is, a set of tags, to facilitate if not ensure instantaneous location accuracy. For example, a set of tags as RF emitters or transmitters may be simultaneously triggered by a telemetry unit from recognized handler events. These tags could be set for a minimum trigger delay of about 600 milliseconds with standard multi-tag scan dither on the trigger. Each tag could produce four sub-blinks with a normal 125 millisecond dithered spacing, creating a maximum time diversity within the short burst window.

As shown in FIG. 12, for example, three tags 28a, 28b, 28c (e.g., one-quarter wavelength tags) could be mounted on a mounting plate 216, which may be mounted on the antenna mast 210. The mounting plate may have a triangular shape, and may provide a ground plane and reduce, if not prevent, reflections from containers below. The tags may be mounted near the corners of the plate to form a counterpoise, as shown schematically in FIG. 11. This type of configuration may provide spatial diversity with a minimized radio frequency radiation below the antenna radiator horizon. More particularly, for example, the tags may be mounted on the plate with sufficient separation for one or more of: (i) minimized coupling and pattern distortion; (ii) adequate spatial diversity; or (iii) minimum footprint to the top mount on the antenna mast. This configuration may also minimize some multi-path from containers and other metal objects below the emission point height, and may provide some filtering.

According to one exemplary aspect of the present invention, functions performed by one or more of the entities of the system, such as one or more of the server 22, TOS 24, LAP 26, tag 28 or controller 60, may be performed by various means, such as hardware and/or firmware, including those described above, alone and/or under control of a computer program or computer software. The computer program may be part of a computer program product for performing one or more functions of exemplary embodiments of the present invention. This computer program product may include a computer-readable storage medium, such as the non-volatile storage medium, and software including computer-readable program code portions, such as a series of computer instructions, embodied in the computer-readable storage medium.

In this regard, FIGS. 4-6 are flowcharts of apparatuses, methods and program products according to exemplary embodiments of the present invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for tracking an asset, the apparatus comprising:
    a tag transmitter;
    a satellite-based sensor; and
    a controller configured to control operation of the tag transmitter and the satellite-based sensor, the apparatus being positioned on an object configured to move or facilitate movement of the asset;
    wherein the controller is configured to:
        cause the tag transmitter to transmit a blink pattern usable to determine a location of the asset based on times of arrival of the blink pattern at receivers;
        collect, from the satellite-based sensor, sensor data indicating a location of the asset, each instance of the sensor data being collected during a respective collection period;
        direct transmission of the sensor data to a host for determining a location of the asset, the host being configured to:
            when the asset is in a first one of a plurality of predefined zones in a coverage area, determine the location of the asset based on the blink pattern transmitted by the tag transmitter; and
            when the asset is in a second one of the plurality of predefined zones in the coverage area, determine the location of the asset based on the sensor data collected from the satellite-based sensor, the second one of the plurality of predefined zones being different than the first one of the plurality of predefined zones.

2. The apparatus according to claim 1, wherein the satellite-based sensor is a global positioning system (GPS) sensor.

3. The apparatus according to claim 1, wherein the controller is configured to compress at least a portion of the sensor data before directing transmission of the sensor data, including being configured to at least one of:

compress redundant data over the respective collection period, or
replace a larger set of data with a smaller set of data from which the larger set of data is determinable or approximable.

4. The apparatus according to claim 1, wherein the controller is configured to buffer the sensor data when a communication link is broken, the controller being configured to transmit the buffered sensor data across the communication link or another communication link when the communication link is re-established or the other communication link is established.

5. The apparatus according to claim 1, wherein the controller is configured to cause the tag transmitter to transmit the blink pattern or collect the sensor data in response to an event affecting the location of the asset.

6. The apparatus according to claim 5, wherein the controller is configured to detect the event or verify the detected event, or communicate with a processor configured to detect the event or verify the detected event, based on a route traversed by the object over a period of time.

7. The apparatus according to claim 5, wherein the controller is configured to detect the event or verify the detected event, or communicate with a processor configured to detect the event or verify the detected event, based on a signature defined based on speed or acceleration values, or ranges of speed or acceleration values, over a period of time.

8. The apparatus according to claim 5, wherein the controller is configured to determine, or communicate with a processor configured to determine, a bearing of the asset when the event occurs based on a route traversed by the object over a period of time.

9. The apparatus according to claim 1, wherein a route traversed by the object over a period of time is determinable based on the blink pattern or the sensor data, the controller being configured to set or adjust a granularity of the route.

10. The apparatus according to claim 1, wherein the controller is configured to direct transmission of the sensor data at one or more random or pseudorandom time periods.

11. The apparatus according to claim 10, wherein the controller is triggerable to direct transmission of the sensor data independent of the one or more random or pseudorandom time periods.

12. A system for tracking an asset, the system comprising:
    an antenna mast supportable by, and extending upward from, an object configured to move or facilitate movement of the asset;
    a wireless locating unit supportable by the antenna mast, the wireless locating unit including a tag transmitter and a satellite-based sensor configured to locate the asset within a geographic area, the geographic area including a plurality of predefined zones; and
    a controller on the object and configured to:
        cause the tag transmitter to transmit blink pulses usable to determine a location of the asset based on times of arrival of the blink pulses at receivers;
        collect, from the satellite-based sensor, sensor data indicating locations of the asset; and
        direct transmission of the sensor data to a host for determining a location of the asset, the host being configured to:
            when the asset is in a first one of the plurality of predefined zones, determine the location of the asset based on the blink pulses transmitted by the tag transmitter; and
            when the asset is in a second one of the plurality of predefined zones, determine the location of the asset based on the sensor data collected from the satellite-based sensor, the second one of the plurality of predefined zones being different than the first one of the plurality of predefined zones.

13. The system according to claim 12, further comprising a plurality of spaced-apart, wireless locating access points configured to receive the blink pulses from the tag transmitter, and wherein the wireless locating unit is supported by the antenna mast at a position permitting line of sight transmission of the blink pulses to the wireless locating access points.

14. The system according to claim 12, wherein the controller is configured to compress at least a portion of the sensor data before directing transmission of the sensor data, including being configured to at least one of:
compress redundant data over a data collection period, or
replace a larger set of data with a smaller set of data from which the larger set of data is determinable or approximable.

15. The system according to claim 12, wherein a route traversed by the object over a period of time is determinable based on the blink pulses or the sensor data, the controller being configured to set or adjust a granularity of the route.

16. The system according to claim 12, wherein the controller is configured to direct transmission of the sensor data at one or more random or pseudorandom time periods, and is triggerable to direct transmission of the sensor data independent of the one or more random or pseudorandom time periods.

17. A method for tracking an asset using a wireless locating unit carried by an object configured to move or facilitate movement of the asset, the wireless locating unit including a tag transmitter and a satellite-based sensor, the method comprising;
transmitting, using the tag transmitter, a blink pattern usable to determine a location of the object based on times of arrival of the blink pattern;
collecting, from the satellite-based sensor, multiple instances of sensor data indicating respective locations of the object;
transmitting the sensor data to a host for determining a location of the asset, and in a manner that accounts for a wireless link between the wireless locating unit and the host, the host being configured to:
when the asset is in a first one of a plurality of predefined zones in a coverage area, determine the location of the asset based on the blink pattern transmitted by the tag transmitter; and
when the asset is in a second one of the plurality of predefined zones in the coverage area, determine the location of the asset based on the sensor data collected from the satellite-based sensor, the second one of the plurality of predefined zones being different than the first one of the plurality of predefined zones.

18. The method according to claim 17 further comprising compressing at least a portion of the sensor data before transmitting the sensor data, compressing at least a portion of the sensor data comprising at least one of:
compressing redundant data over a data collection period, or
replacing a larger set of data with a smaller set of data from which the larger set of data is determinable or approximable.

19. The method according to claim 17 further comprising:
buffering the sensor data when the wireless link is broken; and
transmitting the buffered sensor data across the wireless link or another wireless link when the wireless link is re-established or the other wireless link is established.

20. The method according to claim 17, wherein transmitting the blink pattern is in response to an event affecting location of the asset.

21. The method according to claim 17, wherein a route traversed by the object over a period of time is determinable based on the blink pattern or the sensor data, and further comprising setting or adjusting a granularity of the route.

22. The method according to claim 17, wherein transmitting the sensor data comprises transmitting the sensor data at one or more random or pseudorandom time periods.

* * * * *